(12) United States Patent
Lee

(10) Patent No.: US 8,716,434 B2
(45) Date of Patent: *May 6, 2014

(54) ARAMID COPOLYMER

(75) Inventor: Kiu-Seung Lee, Midlothian, VA (US)

(73) Assignee: E I du Pont de Nemours and Company, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/559,678

(22) Filed: Jul. 27, 2012

(65) Prior Publication Data

US 2013/0203957 A1 Aug. 8, 2013

Related U.S. Application Data

(60) Provisional application No. 61/513,046, filed on Jul. 29, 2011, provisional application No. 61/513,050, filed on Jul. 29, 2011, provisional application No. 61/513,043, filed on Jul. 29, 2011.

(51) Int. Cl.
| | | |
|---|---|---|
| C08G 64/00 | (2006.01) | |
| C08G 69/28 | (2006.01) | |
| C08G 63/02 | (2006.01) | |

(52) U.S. Cl.
CPC .................................. *C08G 69/28* (2013.01)
USPC ........................... 528/372; 528/336; 528/340

(58) Field of Classification Search
CPC ....................................................... C08G 69/28
USPC .......................................... 528/336, 340, 372
See application file for complete search history.

(56) References Cited

U.S. PATENT DOCUMENTS

| | | | |
|---|---|---|---|
| 3,063,966 | A | 11/1962 | Du Pont |
| 3,227,793 | A | 1/1966 | Cipriani |
| 3,414,645 | A | 12/1968 | Morgan |
| 3,600,350 | A | 8/1971 | Kwolek |
| 3,767,756 | A | 10/1973 | Blades |
| 4,018,735 | A | 4/1977 | Nakagawa et al. |
| 4,172,938 | A | 10/1979 | Mera |
| 5,233,004 | A | 8/1993 | Dembek et al. |
| 5,474,842 | A | 12/1995 | Hoiness |
| 5,571,891 | A | 11/1996 | Jung et al. |
| 5,646,234 | A | 7/1997 | Jung et al. |
| 5,667,743 | A | 9/1997 | Tai et al. |
| 5,811,042 | A | 9/1998 | Hoiness |
| 2003/0064316 | A1 | 4/2003 | Zebala |
| 2010/0029159 | A1 | 2/2010 | Ishihara |
| 2011/0046340 | A1 | 2/2011 | DeVos et al. |

FOREIGN PATENT DOCUMENTS

| | | |
|---|---|---|
| CN | 101165078 | 4/2008 |
| CN | 101787582 | 7/2010 |
| RU | 2017866 | 8/1994 |
| RU | 2045586 | 10/1995 |
| RU | 2285760 | 10/2006 |
| RU | 2285761 | 10/2006 |
| WO | WO2005/054337 | 6/2005 |
| WO | WO2005054337 | 6/2005 |
| WO | WO2008105547 | 9/2008 |

OTHER PUBLICATIONS

U.S. Appl. No. 13/559,698, filed Jul. 27, 2012, DuPont.
U.S. Appl. No. 13/559,696, filed Jul. 27, 2012, DuPont.
U.S. Appl. No. 13/559,691, filed Jul. 27, 2012, DuPont.
U.S. Appl. No. 13/559,684, filed Jul. 27, 2012, DuPont.
U.S. Appl. No. 13/559,681, filed Jul. 27, 2012, DuPont.
U.S. Appl. No. 13/559,674, filed Jul. 27, 2012, DuPont.
U.S. Appl. No. 13/559,669, filed Jul. 27, 2012, DuPont.
U.S. Appl. No. 13/559,667, filed Jul. 27, 2012, DuPont.
U.S. Appl. No. 13/559,661, filed Jul. 27, 2012, DuPont.
U.S. Appl. No. 13/559,659, filed Jul. 27, 2012, DuPont.
U.S. Appl. No. 13/559,657, filed Jul. 27, 2012, DuPont.
U.S. Appl. No. 13/559,655, filed Jul. 27, 2012, DuPont.
PCT International Search Report and Written opinion for International Application No. PCT/US2012/048428 Dated Oct. 15, 2012.
PCT International Search Report and Written opinion for International Application No. PCT/US2012/048429 Dated Sep. 28, 2012.
PCT International Search Report and Written opinion for International Application No. PCT/US2012/048448 Dated Sep. 27, 2012.
PCT International Search Report and Written opinion for International Application No. PCT/US2012/048431 Dated Jul. 2, 2013.
PCT International Search Report and Written opinion for International Application No. PCT/US2012/048434 Dated Sep. 28, 2012.
PCT International Search Report and Written opinion for International Application No. PCT/US2012/048435 Dated Sep. 27, 2012.
PCT International Search Report and Written opinion for International Application No. PCT/US2012/048438 Dated Sep. 28, 2012.
PCT International Search Report and Written opinion for International Application No. PCT/US2012/048439 Dated Sep. 27, 2012.
PCT International Search Report and Written opinion for International Application No. PCT/US2012/048442 Dated Sep. 28, 2012.
PCT International Search Report and Written opinion for International Application No. PCT/US2012/048441 Dated Sep. 28 , 2012.
PCT International Search Report and Written opinion for International Application No. PCT/US2012/048444 Dated Sep. 27,2012.
PCT International Search Report and Written opinion for International Application No. PCT/US2012/048484 Dated Sep. 28,2012.

*Primary Examiner* — Terressa Boykin

(57) ABSTRACT

The invention concerns polymer comprising 2-(4-amino phenyl)-5 (6) amino benzimidazole (DAPBI), PPD, and terephthaloyl dichloride, the polymer having a IPC peak block ratio of 1.52 to 1.56 and an inherent viscosity of greater than 2 dl/g.

6 Claims, 1 Drawing Sheet

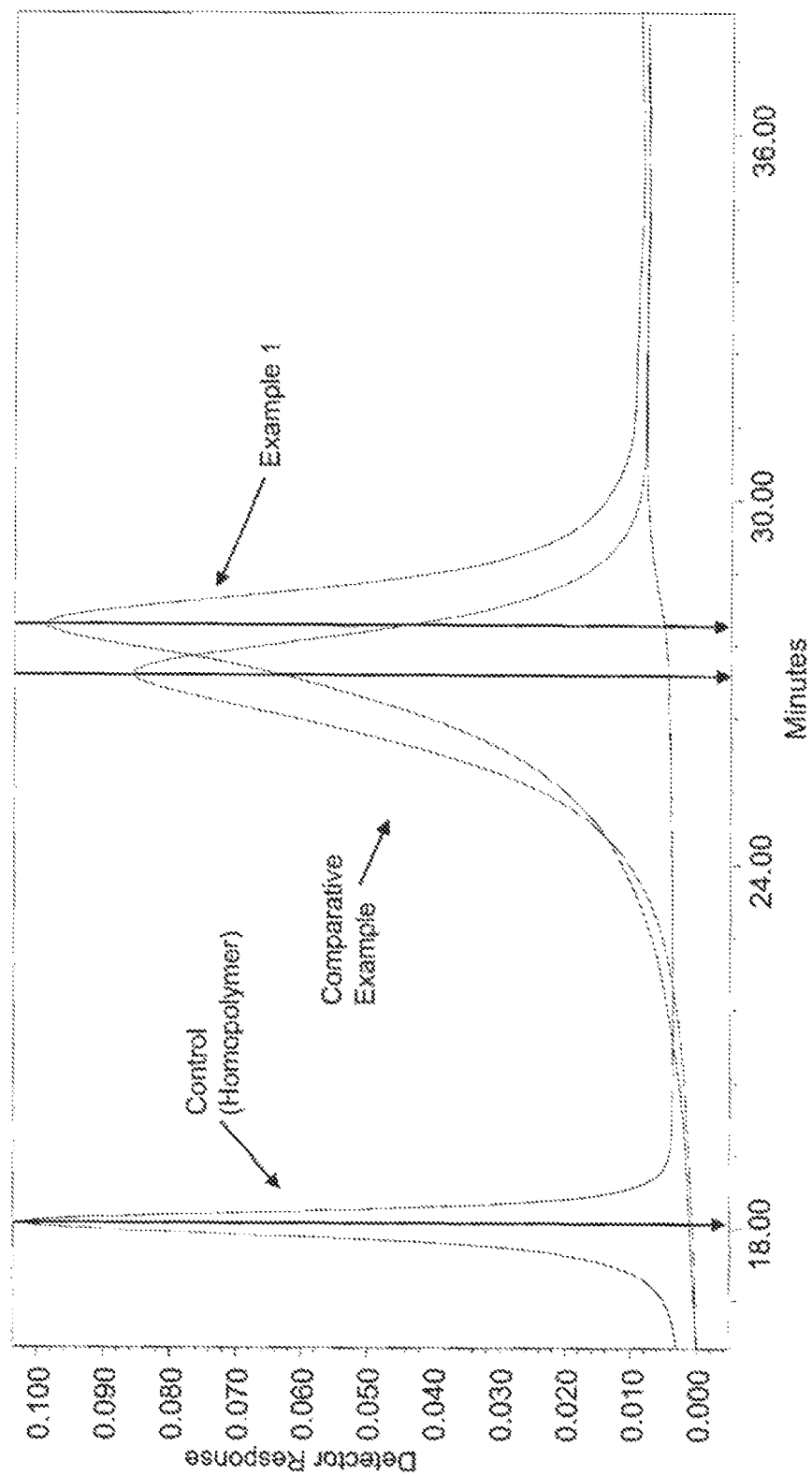

ARAMID COPOLYMER

TECHNICAL FIELD

The present application concerns methods of producing aramid polymers derived from 5(6)-amino-2-(p-aminophenyl)benzimidazole (DAPBI), para-phenylenediamine (PPD) and terephthaloyl dichloride (TCl) that are capable of forming fibers having superior physical properties.

BACKGROUND

Fibers derived from 5(6)-amino-2-(p-aminophenyl)benzimidazole (DAPBI), para-phenylenediamine (PPD) and terephthaloyl dichloride (TCl or T, also commonly referred to as terephthaloyl chloride) are known in the art. Such copolymers are the basis for a high strength fibers manufactured in Russia, for example, under the trade names Armos® and Rusar®. See, Russian Patent Application No. 2,045,586.

The two amines on DAPBI are very different in reactivity and positional factors. The amine shown to the right in the below structure (the azole amine) is an order of magnitude more reactive than the amine to the left in the structure (the benzyl amine).

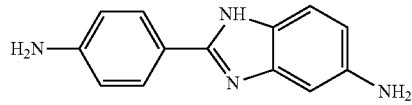

As a result, DAPBI/PPD copolymers prepared by conventional a polymerization process in NMP/CaCl$_2$ solvent system tend to have no control over the position of the monomer components. It is believed a factor in creating higher strength fibers from DAPBI/PPD copolymer is the arrangement of the comonomers along the polymer chain. In particular, controlling the distribution of PPD and DAPBI comonomers is believed to help prevent the formation of crystal solvates in sulfuric acid solution and help the alignment of polymer chains during the heat treatment of fibers made from the copolymer, resulting in fibers with better mechanical properties.

SUMMARY

In some aspects, the invention concerns a polymer comprising 2-(4-amino phenyl)-5 (6) amino benzimidazole (DAPBI), PPD, and terephthaloyl dichloride, the polymer having a IPC peak block ratio of 1.52 to 1.56, preferably 1.53-1.55, and an inherent viscosity of greater than 2 dl/g. Some preferred polymers have an inherent viscosity of 4 dl/g or greater. In some embodiments, the polymer is capable of being dissolved in a solvent system comprising (i) N-methyl-2-pyrrolidone (NMP) or dimethylacetamide (DMAC) and (ii) an inorganic salt; wherein the polymer is capable of being redissolved in the solvent system after the polymer has been removed from the solvent system.

The invention also concerns processes for forming a polymer comprising residues of 2-(4-amino phenyl)-5 (6) amino benzimidazole (DAPBI), paraphenylene diamine (PPD), and terephthaloyl dichloride, comprising the steps of: (a) forming a solution of oligomers having amine end groups from two moles of DAPBI and one mole of terephthaloyl dichloride in a solvent system comprising an organic solvent and an inorganic salt; (b) adding PPD to the solution of oligomers; and (c) adding additional terephthaloyl dichloride to form a polymer. In some embodiments, the amount of terephthaloyl dichloride added in step c) is adequate to achieve stoichiometric balance based on the amount of diamines in the solution.

Preferred organic solvents include N-methyl-2-pyrrolidone (NMP) and dimethylacetamide (DMAC). Preferred inorganic salts include LiCl and CaCl$_2$. In certain embodiments, the solvent system is NMP/CaCl$_2$.

The invention can involve the further step of isolating the polymer. Some embodiments of the invention involve a step comprising the step of comminuting the polymer. Polymer, comminuted or not comminuted, can be treated with one or more washing steps, neutralizing steps, or both.

In some aspects, the invention additionally concerns the step of dissolving the polymer in a solvent comprising sulfuric acid to form a solution suitable for spinning fibers. The polymer to be dissolved includes the isolated polymer that may or may not have been washed and/or neutralized and polymer may or may not have been comminuted. Alternately, an organic solvent (optionally containing an inorganic salt) can be used to form the solution suitable for spinning fibers. While any suitable solvent can be used to dissolve the polymer, in some embodiments the solvent comprises N-methyl-2-pyrrolidone (NMP) or dimethylacetamide (DMAC) and an inorganic salt to form a solution suitable for spinning fibers. Examples of suitable inorganic salts are LiCl and CaCl$_2$.

In some preferred embodiments, the molar ratio of DAPBI to phenylene diamine is in the range of from 0.25 to 4.0. For some processes, the amount of the slurry that is DAPBI in step (a) is in the range of from 1 to 10 weight %. In certain processes, the amount of oligomeric solution that is PPD in step b) is in the range of from 0.5 to 5.5 weight %. In certain embodiments, the additional terephthaloyl dichloride in step c) is an amount that is in the range of from 100 to 400 mole percent relative to the amount of PPD added in step b).

For some processes, the NMP/CaCl$_2$ solvent has a CaCl$_2$ weight percent in the range of from 0.3 to 10%.

In another aspect, the invention concerns processes for forming a polymer comprising residues of 2-(4-amino phenyl)-5 (6) amino benzimidazole (DAPBI), PPD, and terephthaloyl dichloride, comprising the steps of: a) forming a slurry of DAPBI in a solvent system comprising an organic solvent and an inorganic salt; b) adding terephthaloyl dichloride to the slurry terephthaloyl dichloride in the amount of up to one-half mole for every mole of DAPBI in the slurry; c) agitating the slurry to react the DAPBI and terephthaloyl dichloride to form an oligomeric solution; d) adding PPD to the oligomeric solution and agitating until substantially all of the PPD is dissolved, e) adding terephthaloyl dichloride in an amount of greater than one mole for every mole of PPD in the solution to form a prepolymer solution; and e) agitating the prepolymer solution to form a polymer. The process can further comprise the step of dissolving the polymer in a solvent comprising sulfuric chloride to form a solution suitable for spinning fibers.

BRIEF DESCRIPTION OF THE DRAWINGS

The foregoing summary, as well as the following detailed description, is further understood when read in conjunction with the appended drawings. For the purpose of illustrating the invention, there is shown in the drawings exemplary embodiments of the invention; however, the invention is not limited to the specific methods, compositions, and devices disclosed. In the drawings:

FIG. 1 presents IPC results of the examples versus that of DAPBI-T homopolymer.

DETAILED DESCRIPTION OF ILLUSTRATIVE EMBODIMENTS

The present invention can be understood more readily by reference to the following detailed description taken in connection with the accompanying figures and examples, that form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

In some aspects, the invention concerns a polymer comprising 2-(4-amino phenyl)-5 (6) amino benzimidazole (DAPBI), PPD, and terephthaloyl dichloride, the polymer having a IPC peak block ratio of 1.52 to 1.56, preferably 1.53-1.55, and an inherent viscosity of greater than 2 dl/g. Some preferred polymers have an inherent viscosity of 4 dl/g or greater. In some embodiments, the polymer is capable of being dissolved in a solvent system comprising (i) N-methyl-2-pyrrolidone (NMP) or dimethylacetamide (DMAC) and (ii) an inorganic salt; wherein the polymer is capable of being redissolved in the solvent system after the polymer has been removed from the solvent system.

In other aspects, the invention concerns processes for forming a polymer comprising residues of 2-(4-amino phenyl)-5 (6) amino benzimidazole (DAPBI), PPD, and terephthaloyl dichloride, comprising the steps of: a) forming a slurry of DAPBI in a solvent system comprising an organic solvent and an inorganic salt; b) adding terephthaloyl dichloride to the slurry in an amount of up to one-half mole for every mole of DAPBI in the slurry; c) agitating the slurry to react the DAPBI and terephthaloyl dichloride to form an oligomeric solution; d) adding PPD to the oligomeric solution and agitating until substantially all of the PPD is dissolved, e) adding terephthaloyl dichloride in an amount of greater than one mole for every mole of PPD in the solution to form a prepolymer solution; and e) agitating the prepolymer solution to form a polymer. The process can further comprise the step of dissolving the polymer in a solvent comprising sulfuric chloride to form a solution suitable for spinning fibers.

In yet other aspects, the invention concerns processes for forming a polymer comprising residues of 2-(4-amino phenyl)-5 (6) amino benzimidazole (DAPBI), paraphenylene diamine (PPD), and terephthaloyl dichloride, comprising the steps of: (a) forming a solution of oligomers having amine end groups from two moles of DAPBI and one mole of terephthaloyl dichloride in a solvent system comprising an organic solvent and an inorganic salt; (b) adding PPD to the solution of oligomers; and (c) adding additional terephthaloyl dichloride to form a polymer. In some embodiments, the amount of terephthaloyl dichloride added in step c) is adequate to achieve stoichiometric balance based on the amount of diamines in the solution.

The instant processes utilized by the present invention allows two moles of DAPBI to react with one mole of terephthaloyl dichloride first. It is believed the faster reacting amines (the azole amines) react with both acid chlorides on the terephthaloyl dichloride (TCl) molecule creating a distribution of oligomers that preferentially comprise "trimers" ending with slower reacting amines (the benzyl amines) as terminal groups. In these resulting trimers, the two end amine groups have equivalent reactivity.

To this trimer, paraphenylene diamine (PPD) is added and dissolved, and additional terephthaloyl dichloride (TCl) monomer is added to make DAPBI/PPD-T copolymers with controlled head-to-tail placement of DAPBI units. As an added benefit, the resulting polymer is soluble in organic solvent system such as DMAc/LiCl as well as sulfuric acid.

Vessels useful for producing polymers, and temperatures and other conditions useful in producing polymers, include, for example, details disclosed in such patents as U.S. Pat. No. 3,063,966 to Kwolek et al.; U.S. Pat. No. 3,600,350 to Kwolek; U.S. Pat. No. 4,018,735 to Nakagawa et al.; and U.S. Pat. No. 5,646,234 to Jung et al.

In some embodiments, the organic solvent is N-methyl-2-pyrrolidone (NMP) or dimethylacetamide (DMAC). Suitable inorganic salts include LiCl and $CaCl_2$. In one preferred embodiment, the solvent system is $NMP/CaCl_2$. In certain embodiments, the $NMP/CaCl_2$ solvent has a $CaCl_2$ weight percent in the range of from 1 to 10%. It should be noted that the solubility of $CaCl_2$ in NMP is about 8%. As such when more than 8% $CaCl_2$ is used, some undissolved $CaCl_2$ is present in the solvent system. The solvents and salts can be obtained from commercial sources and, if desired, purified by methods known to those skilled in the art.

In some processes, the molar ratio of DAPBI to paraphenylene diamine is in the range of from 0.25 to 4.0. This ratio is equivalent to a DAPBI/PPD ratio of 20/80 to 80/20. In certain processes, the amount of the slurry that is DAPBI in step (a) is in the range of from 0.5 to 10 weight %.

For some processes, the amount of paraphenylene diamine added in step (d) is in the range of from 0.2 to 6.0 weight %, based on all the components in the oligomeric solution.

In some embodiments, step d) or e) or both steps d) and e) is/are performed under agitation. The polymer can be isolated in some embodiments. The isolated polymer can be comminuted a desired particle size to assist in processing and storage. The polymer can be treated with one or more washing steps, neutralizing steps, or both. These washing and/or neutralizing steps can be performed before or after comminuting the polymer. Equipment suitable for use in agitation of the reaction mixtures, washing and neutralization steps, and comminuting the polymer is known to those skilled in the art.

Molecular weights of polymers are typically monitored by, and correlated to, one or more dilute solution viscosity measurements. Accordingly, dilute solution measurements of the relative viscosity ("$V_{rel}$" or "$\eta_{rel}$" or "$n_{rel}$") and inherent viscosity ("$V_{inh}$" or "$\eta_{inh}$" or "$n_{inh}$") are typically used for monitoring polymer molecular weight. The relative and inherent viscosities of dilute polymer solutions are related according to the expression $$V_{inh} = \ln(V_{rel})/C,$$

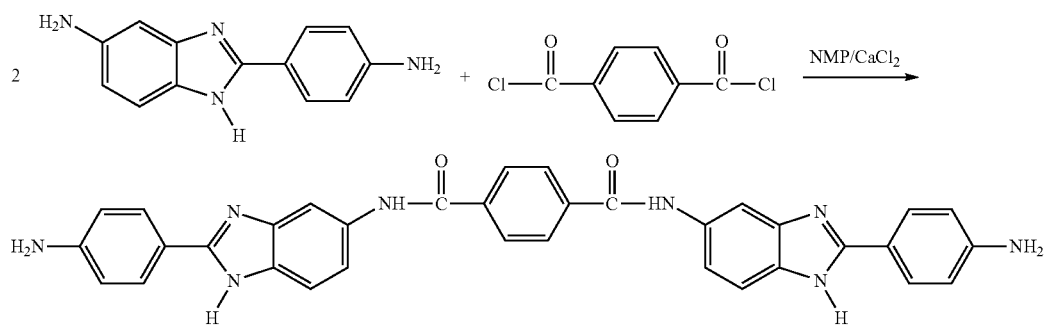

where ln is the natural logarithm function and C is the concentration of the polymer solution. $V_{rel}$ is a unitless ratio, thus $V_{inh}$ is expressed in units of inverse concentration, typically as deciliters per gram ("dl/g").

Neutralization of the polymer can occur in one or more steps by contacting the polymer with a base. Suitable bases include NaOH; KOH; $Na_2CO_3$; $NaHCO_3$; $NH_4OH$; $Ca(OH)_2$; $K_2CO_3$; $KHCO_3$; or trialkylamines, preferably tributylamine; other amines; or mixtures thereof. In one embodiment, the base is water soluble. In some preferred examples the neutralization solution is an aqueous solution of base.

The polymer can also be washed with water independent of or prior to and/or after the neutralization step.

In some aspects, the invention additionally concerns the step of dissolving the polymer in a solvent comprising sulfuric acid to form a solution suitable for spinning fibers (also referred to as a "spin dope"). The polymer to be dissolved includes the isolated polymer that may or may not have been washed and/or neutralized and polymer may or may not have been comminuted. While any suitable solvent can be used to dissolve the polymer, in some embodiments the solvent comprises N-methyl-2-pyrrolidone (NMP) or dimethylacetamide (DMAC) and an inorganic salt to form a solution suitable for spinning fibers. The dissolved polymer can be spun into fibers by conventional techniques known to those skilled in the art.

The spin dope containing the copolymer described herein can be spun into dope filaments using any number of processes; however, wet spinning and "air-gap" spinning are the best known. The general arrangement of the spinnerets and baths for these spinning processes is well known in the art, with the figures in U.S. Pat. Nos. 3,227,793; 3,414,645; 3,767,756; and 5,667,743 being illustrative of such spinning processes for high strength polymers. In "air-gap" spinning the spinneret typically extrudes the fiber first into a gas, such as air and is a preferred method for forming filaments As used herein, the terms filaments and fibers are used interchangeably.

The fiber can be contacted with one or more washing baths or cabinets. Washes can be accomplished by immersing the fiber into a bath or by spraying the fiber with the aqueous solution. Washing cabinets typically comprise an enclosed cabinet containing one or more rolls that the yarn travels around a number of times, and across, prior to exiting the cabinet. As the yarn travels around the roll it is sprayed with a washing fluid. The washing fluid is continuously collected in the bottom of the cabinet and drained therefrom.

The temperature of the washing fluid(s) is preferably greater than 30° C. The washing fluid can also be applied in vapor form (steam), but is more conveniently used in liquid form. Preferably, a number of washing baths or cabinets are used. The residence time of the yarn in any one washing bath or cabinet will depend on the desired concentration of residual sulfur in the yarn. In a continuous process, the duration of the entire washing process in the preferred multiple washing bath(s) and/or cabinet(s) is preferably no greater than about 10 minutes, more preferably greater than about 5 seconds. In some embodiments the duration of the entire washing process is 20 seconds or more; in some embodiments the entire washing is accomplished in 400 seconds or less. In a batch process, the duration of the entire washing process can be on the order of hours, as much as 12 to 24 hours or more.

If needed, neutralization of the acid (such as sulfuric acid solvent) in the yarn can occur in a bath or cabinet. In some embodiments, the neutralization bath or cabinet can follow one or more washing baths or cabinets. Washes can be accomplished by immersing the fiber into a bath or by spraying the fiber with the aqueous solution. Neutralization can occur in one bath or cabinet or in multiple baths or cabinets. In some embodiments, preferred bases for the neutralization of sulfuric acid impurity include NaOH; KOH; $Na_2CO_3$; $NaHCO_3$; $NH_4OH$; $Ca(OH)_2$; $K_2CO_3$; $KHCO_3$; or trialkylamines, preferably tributylamine; other amines; or mixtures thereof. In one embodiment, the base is water soluble. In some preferred examples the neutralization solution is an aqueous solution containing 0.01 to 1.25 mols of base per liter, preferably 0.01 to 0.5 mols of base per liter. The amount of cation is also dependent on the time and temperature of exposure to the base and the washing method. In some preferred embodiments, the base is NaOH or $Ca(OH)_2$.

After treating the fiber with base, the process optionally can include the step of contacting the yarn with a washing solution containing water or an acid to remove all or substantially all excess base. This washing solution can be applied in one or more washing baths or cabinets.

After washing and neutralization, the fiber or yarn can be dried in a dryer to remove water and other liquids. One or more dryers can be used. In certain embodiments, the dryer can be an oven that uses heated air to dry the fibers. In other embodiments, heated rolls can be used to heat the fibers. The fiber is heated in the dryer to a temperature of at least about 20° C. but less than about 100° C. until the moisture content of the fiber is 20 weight percent of the fiber or less. In some embodiments the fiber is heated to 85° C. or less. In some embodiments the fiber is heated under those conditions until the moisture content of the fiber is 14 weight percent of the fiber or less. The inventors have discovered that low temperature drying is a preferred route to improved fiber strength. Specifically, the inventors have found that the best fiber strength properties are achieved when the first drying step (i.e. heated roll, heated atmosphere as in an oven, etc.) experienced by the never-dried yarn is conducted at gentle temperatures not normally used in continuous processes used to dry high strength fibers on commercial scale. It is believed that the copolymer fiber has more affinity to water than PPD-T homopolymer; this affinity slows the diffusion rate of water out of the polymer during drying and consequently if the never-dried yarn is directly exposed to typical high drying temperatures, generally used to create a large thermal driving force and reduce drying time, irreparable damage to the fiber occurs resulting in lower fiber strength. In some embodiments, the fiber is heated at least to about 30° C.; in some embodiments the fiber is heated at least to about 40° C.

The dryer residence time is less than ten minutes and is preferably less than 180 seconds. The dryer can be provided with a nitrogen or other non-reactive atmosphere. The drying step typically is performed at atmospheric pressure. If desired, however, the step can be performed under reduced pressure. In one embodiment, the filaments are dried under a tension of at least 0.1 gpd, preferably a tension of 2 gpd or greater.

The invention also concerns a polymer powder comprising residues of 2-(4-amino phenyl)-5 (6) amino benzimidazole (DAPBI), paraphenylene diamine, and terephthaloyl dichloride, capable of being dissolved in N-methyl-2-pyrrolidone (NMP) or dimethylacetamide (DMAC) and an inorganic salt. In other words, the polymer is capable of being redissolved in the solvent system after the polymer has been removed or isolated from the solvent system. It should be noted that polymers made by traditional processes, once isolated, do not have the capability of being redissolved in a solvent system of NMP or DMAc and an inorganic salt but require a solvent such as sulfuric acid to achieve a spinning solution. In some embodiments, the polymer powder has an inherent viscosity of greater than 2 dl/g. In some preferred embodiments, the polymer has an inherent viscosity of 4 dl/g or greater.

In yet another aspect, the invention concerns a polymer comprising 2-(4-amino phenyl)-5 (6) amino benzimidazole (DAPBI), PPD, and terephthaloyl dichloride, the polymer having a IPC peak block ratio (Relative Elution Time of sample/DAPBI-T homopolymer) of 1.52 to 1.56, preferably 1.53-1.55, and an inherent viscosity of greater than 2 dl/g.

Definitions

As used herein, the term "residue" of a chemical species refers to the moiety that is the resulting product of the chemical species in a particular reaction scheme or subsequent formulation or chemical product, regardless of whether the moiety is actually obtained from the chemical species. Thus, a copolymer comprising residues of paraphenylene diamine refers to a copolymer having one or more units of the formula:

Similarly, a copolymer comprising residues of DAPBI contains one or more units of the structure:

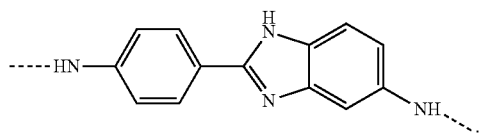

A copolymer having residues of terephthaloyl dichloride contains one or more units of the formula:

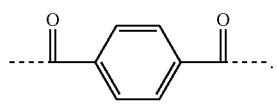

Dashed lines indicate bond positions.

The term "polymer," as used herein, means a polymeric compound prepared by polymerizing monomers, whether of the same or a different type. The term "copolymer" (which refers to polymers prepared from two different monomers), the term "terpolymer" (which refers to polymers prepared from three different types of monomers), and the term "quadpolymer (which refers to polymers having four different types of monomers) are included in the definition of polymer.

The term "powder" when referring to polymer means particles of the copolymer having neither fibrous qualities like fiber or pulp, nor fibrous film-like qualities like fibrids. Individual particles tend to be fibril-free, have a random shape, and an effective particle diameter of 840 micrometers or less. U.S. Pat. Nos. 5,474,842 & 5,811,042 are illustrative.

As used herein, "stoichiometric amount" means the amount of a component theoretically needed to react with all of the reactive groups of a second component. For example, "stoichiometric amount" refers to the moles of terephthalic dichloride needed to react with substantially all of the amine groups of the amine component (paraphenylene diamine and DAPBI). It is understood by those skilled in the art that the term "stoichiometric amount" refers to a range of amounts that are typically within 10% of the theoretical amount. For example, the stoichiometric amount of terephthalic dichloride used in a polymerization reaction can be 90-110% of the amount of terephthalic acid theoretically needed to react with all of the paraphenylene diamine and DPABI amine groups.

The "fiber" refers to a relatively flexible, macroscopically homogeneous body having a high ratio of length to width across its cross-sectional area perpendicular to its length. In preferred embodiments, the fiber is upon inspection essentially solid in cross-section, having few random voids or open areas that would be considered defects in the fibers.

The term "organic solvent" is understood herein to include a single component organic solvent or a mixture of two or more organic solvents. In some embodiments, the organic solvent is dimethylformaaide, dimethylacetamide (DMAC), N-methyl-2-pyrrolidone (NMP), or dimethylsulfoxide. In some preferred embodiments, the organic solvent is N-methyl-2-pyrrolidone or dimethylacetamide.

The term "inorganic salt" refers to a single inorganic salt or to a mixture of two or more inorganic salts. In some embodiments, the inorganic salt is sufficiently soluble in the solvent and liberates an ion of a halogen atom having an atomic number in the solvent. In some embodiments, the preferred inorganic salt is KCl, $ZnCl_2$, LiCl or $CaCl_2$. In certain preferred embodiments, the inorganic salt is LiCl or $CaCl_2$.

By "never-dried" it is meant the moisture content of the fiber is at least 75 weight percent of the fiber.

As used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. When any variable occurs more than one time in any constituent or in any formula, its definition in each occurrence is independent of its definition at every other occurrence. Combinations of substituents and/or variables are permissible only if such combinations result in stable compounds.

Test Methods

Inherent viscosity can be determined using a solution in which a polymer is dissolved in a concentrated sulfuric acid with a concentration of 96 wt % at a polymer concentration (C) of 0.5 g/dl and at a temperature of 25° C. Inherent viscosity is then calculated as $\ln(t_{poly}/t_{solv})/C$ where $t_{poly}$ is the drop time for the polymer solution and $t_{solv}$ is the drop time of the pure solvent.

Interaction Polymer Chromatography (IPC) method was used to analyze the microstructure of p-aramid copolymers. The chromatographic separations were performed on Alliance 2695™ Separation Module with column heater at 60° C. from Waters Technologies (Milford, Mass., USA). The module provides a low-pressure quaternary gradient pumping system with lag volume 0.6 ml to the column outlet, online solvent degassing and automatic sample injection from 2-ml vials. Waters UV/Vis 487™ photometer at 320 nm wavelength was used as an online detector. Two components of a mobile phase used were water (component A) and N,N'-dimethylformamide (DMAc) with 4% lithium chloride (LiCl) (component B). 20 minutes linear gradient from 70% B to 100% B at flow rate 0.5 ml/min was used for separation. Silica NovaPak™ 150×3.9 mm with 60 A pore size from Waters was used as a stationary phase. Each sample was dissolved in DMAc with 4% LiCl at 120° C. with moderate agitation for 12 hours at concentration 0.2 mg/ml, and injected using 10 ml injection loop.

Empower™ version 2 software module from Waters was used for data acquisition and reduction. The IPC peak block ratio is then determined by running a data set including a control of DAPBI-T homopolymer and the copolymer to be evaluated. The FIGURE is an typical illustration of the peaks for the homopolymer and copolymers being evaluated, with the vertical arrows indicating the peak values. The IPC peak block ratio is then calculated by the following formula:

IPC peak block ratio=Minutes to peak for copolymer/ Minutes to peak for homopolymer.

The invention is illustrated by the following examples, which are not intended to be limiting in nature.

EXAMPLES

NMP, DMAC, LiCl, $CaCl_2$, DAPBI, PPD and TCl were obtained from commercial sources.

Example 1

This example illustrates the preparation of DAPBI/PPD-T copolymers with controlled "Head-Tail" DAPBI Placement. DAPBI [5(6)-amino-2-(p-aminophenyl)benzimidazole] has two amine groups having grossly different reactivity, so-called asymmetric diamine. Amine group attached to the benzene ring with fused imidazole ring react an order of magnitude faster than the amine group on the benzene ring alone at opposite side of the molecule. Head and tail in this example stand for the faster/slower reacting amines, respectively; that is, the "Head" is the benzyl amine and the "Tail" is the azole amine.

Polymer Preparation:

To 1 liter reaction kettle equipped with basket stirrer, nitrogen inlet/outlet, 83.75 grams of NMP/$CaCl_2$ premix (8.3 wt % (weight of salt/total weight of salt plus solvent)), 163.30 g of NMP (N-methyl-2-pyrrolidone], and 12.288 g (0.055 moles) of DAPBI was added and stirred for 10 minutes. At this point DAPBI was not completely dissolved in the solvent system. The content was stirred in ice-water bath to cool the mixture below 10° C. 5.562 grams (0.027 moles) of TCl (terephthaloyl dichloride) was added all at once and stirred for 5 minutes. At this point, the solution became clear as DAPBI reacted with TCl. The ice water bath was removed, and 2.539 grams (0.023 moles) of PPD (p-phenylene diamine) was added and stirred until all PPD was dissolved in the solution. 10.340 grams (0.051 moles) of TCl was added all at once and stirred. The solution became very viscous and gelled in about 4 minutes. The highly viscous reaction mixture was then stirred for another 25 minutes. The resulting polymer was transferred to Waring® Blender and ground to small particles and washed several times with water to remove solvent (NMP/$CaCl_2$) and excess HCl generated by the reaction. Then the polymer was neutralized with sodium bicarbonate and finally washed with water a few times to get neutral polymer. The polymer was transferred into a tray and dried at 120° C. overnight in a vacuum oven with a nitrogen sweep. The inherent viscosity of the polymer was 8.15.

Solubility of the Polymer in Organic Solvent (DMAc/LiCl (4 wt % (Weight of Salt/Total Weight of Salt Plus Solvent)):

0.125 grams of above polymer was added to a solvent of 25 ml of (DMAc/LiCl, 4 wt % (weight of salt/total weight of salt plus solvent)) in a glass vial, and stirred in a shaker at room temperature. The polymer dissolved completely and provided a clear solution.

Comparison Example

This example illustrates the preparation of DAPBI/PPD-T copolymer in NMP/$CaCl_2$ solvent by a conventional way of adding TCl to the solution of both DAPBI and PPD in the solvent.

83.71 g of NMP/$CaCl_2$ premix (8.3 wt % (weight of salt/total weight of salt plus solvent)), 163.32 g of NMP, and 2.538 g [0.023 moles] of PPD were added to a 1-liter reaction kettle equipped with basket stirrer and nitrogen inlet/outlet. The mixture was stirred at room temperature until all PPD was dissolved completely in the solvent, then 12.282 g (0.055 moles) of DAPBI was added and stirred for 15 more minutes at room temperature. The solution looked milky due to the undissolved DAPBI. The mixture was cooled to below 10° C. by placing in an ice water bath and stirred for 15 minutes. A first portion of 5.573 g (0.027 moles) of TCl was then added and stirred for 5 minutes. The ice-water bath was removed and a second portion of 10.351 g of TCl was then added all at once and stirred. The solution became very viscous and gelled within 4 minutes and the stirring continued for another 25 minutes. Highly viscous lumps of polymer were transferred to a Waring® blender and ground to small particles and washed several times to remove solvent (NMP/$CaCl_2$) and excess HCl generated by the reaction. Then the polymer was neutralized with sodium bicarbonate and finally washed with water a few times to get neutral polymer. The polymer was transferred into a tray and dried at 120° C. over night in vacuum oven with nitrogen sweep. The measured polymer inherent viscosity was 5.47 dl/g.

Solubility of the Polymer in Organic Solvent (DMAc/LiCl(4 wt % Weight of Salt/Total Weight of Salt Plus Solvent)

0.125 grams of the polymer of the Comparative Example was added to 25 ml of (DMAc/LiCl, 4 wt % (weight of salt/total weight of salt plus solvent)) in a glass vial, and stirred in the shaker at room temperature. The polymer did not dissolve at all and there was no indication of swelling.

Determination of IPC Values

IPC peak block ratios were determined for the polymer of Example 1 and the Comparison Example by the test method described above. Results are presented below.

| | Peak Value | Peak Ratio |
|---|---|---|
| Homopolymer (Control) | 18.09 min | NA |
| Example 1 | 27.94 min | 1.54 |
| Comparison | 27.09 min | 1.50 |

What is claimed:

1. A polymer comprising 2-(4-amino phenyl)-5 (6) amino benzimidazole (DAPBI), PPD, and terephthaloyl dichloride, the polymer having a IPC peak block ratio of 1.52 to 1.56 and an inherent viscosity of greater than 2 dl/g.

2. The polymer of claim 1 having an inherent viscosity of 4 dl/g or greater.

3. The polymer of claim 1, having a IPC peak block ratio of 1.53 to 1.55.

4. The polymer of claim 1 wherein said polymer is capable of being dissolved in a solvent system comprising (i) N-methyl-2-pyrrolidone (NMP) or dimethylacetamide (DMAC) and (ii) an inorganic salt; wherein said polymer is capable of being redissolved in said solvent system after said polymer has been removed from said solvent system.

5. The polymer of claim 4 having an inherent viscosity of greater than 2 dl/g.

6. The polymer of claim 5 having an inherent viscosity of 4 dl/g or greater.

\* \* \* \* \*